United States Patent [19]
Albritton et al.

[11] 3,785,558
[45] Jan. 15, 1974

[54] SINGLE FLOAT WATER COOLER

[75] Inventors: George W. Albritton, Houston; Ronald C. Wendt, Seabrook, both of Tex.

[73] Assignee: Ashbrook Corporation, Houston, Tex.

[22] Filed: Sept. 27, 1972

[21] Appl. No.: 292,721

[52] U.S. Cl................ 239/16, 261/36, 261/120, 210/242
[51] Int. Cl................ B01f 5/20, E03b 9/20
[58] Field of Search............... 239/16; 261/36, 120, 261/89, DIG. 65; 210/242

[56] References Cited
UNITED STATES PATENTS

| | | | |
|---|---|---|---|
| 3,416,729 | 12/1968 | Ravitts et al. | 239/16 |
| 3,640,514 | 2/1972 | Albritton | 261/120 |
| 3,709,470 | 1/1973 | Auler et al. | 261/120 |
| 3,669,422 | 6/1972 | Nogaj | 261/120 |
| 3,680,845 | 8/1972 | Carlsmith et al. | 261/120 |
| 3,572,658 | 3/1971 | Ravitts | 239/16 |
| 3,497,185 | 2/1970 | Dively | 261/120 |

*Primary Examiner*—Allen N. Knowles
*Attorney*—Martin Kirkpatrick

[57] ABSTRACT

Single float, multiple spray water coolers having a load waterline and a central cylindrical duct providing a vertical flow passage with an axial flow non-sealing impeller mounted therein and a driving motor mounted thereabove. A plurality of water conduits are mounted on the float connected at their inner ends to the duct above the impeller, and extend outwardly above the load waterline of the float with their outer ends having upwardly directed spray nozzles.

5 Claims, 4 Drawing Figures

PATENTED JAN 15 1974 3,785,558

SINGLE FLOAT WATER COOLER

This invention relates to water coolers and more particularly to floating surface water coolers of the vertical impeller type for cooling a body of water by spraying water upwardly from it.

Floating surface water coolers of the vertical impeller type are well known, being shown and described, for example, in U.S. Pat. No. 3,640,512. Such coolers, although generally effective, produce relatively large streams of water which are not sufficiently dispersed as a spray for most efficient cooling while floating coolers of the multiple float type, such as are shown and described in U.S. Pat. No. 3,622,074, for example, although more efficient, are subject to other deficiencies. Among these deficiencies are the great weight and bulk of such coolers, due to their multiple floats and the water contained in their submerged pipes extending between the floats, which raises serious problems whenever the cooler must be raised from the water for cleaning marine growth from its submerged portions, and also problems caused by the freezing of such contained water in northern climates.

Accordingly, it is a major object of the present invention to provide multiple spray water coolers not subject to the above mentioned deficiencies.

The above and still further objects of the present invention are uniquely accomplished by providing multiple spray cooling apparatus comprising a single floating support having a load waterline and a central cylindrical duct providing a vertical flow passage, an axial flow non-sealing impeller mounted in the duct below the load waterline, impeller driving means including a motor mounted above the floating support and having a downwardly extending driving shaft coincident with the axis of the impeller for driving it, a plurality of outwardly extending water conduits mounted on the floating support and connected at their inner ends to the duct above the impeller, said conduits being positioned above the load waterline of the support, preferably with their outer ends at least at a vertical height above said load waterline as great as their said inner ends, and upwardly directed spray nozzle means mounted on the conduits for spraying water from the impeller, said water being free to drain back through the conduits and duct upon stopping of the impeller for complete drainage of the conduits.

For the purpose of more fully explaining the above as well as further objects and features of the invention, reference is now made to the following detailed description of preferred embodiments thereof, taken together with the accompanying drawings, wherein.

Figure 1:
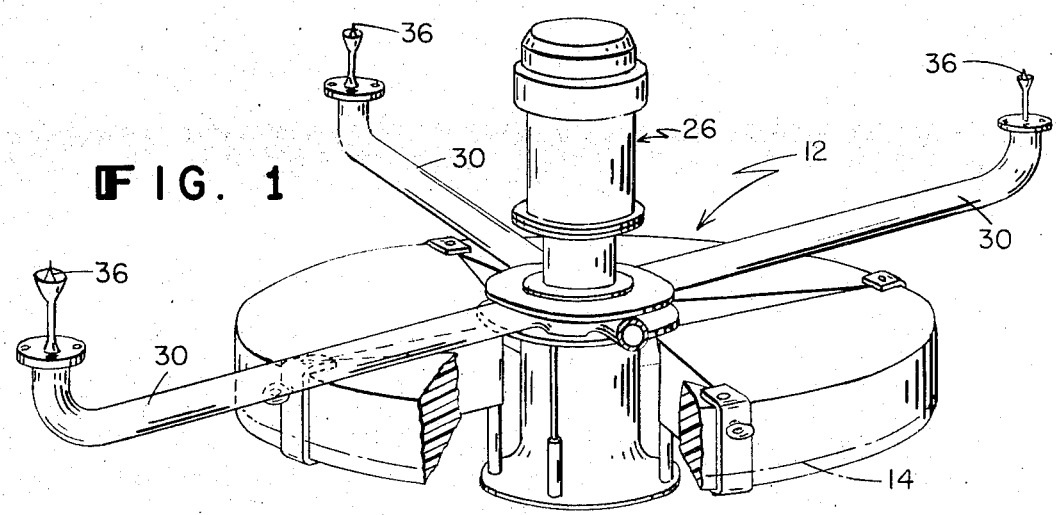
FIG. 1 is an isometric view, partly broken away, of a first embodiment of the water cooler of the invention.
Figure 2:
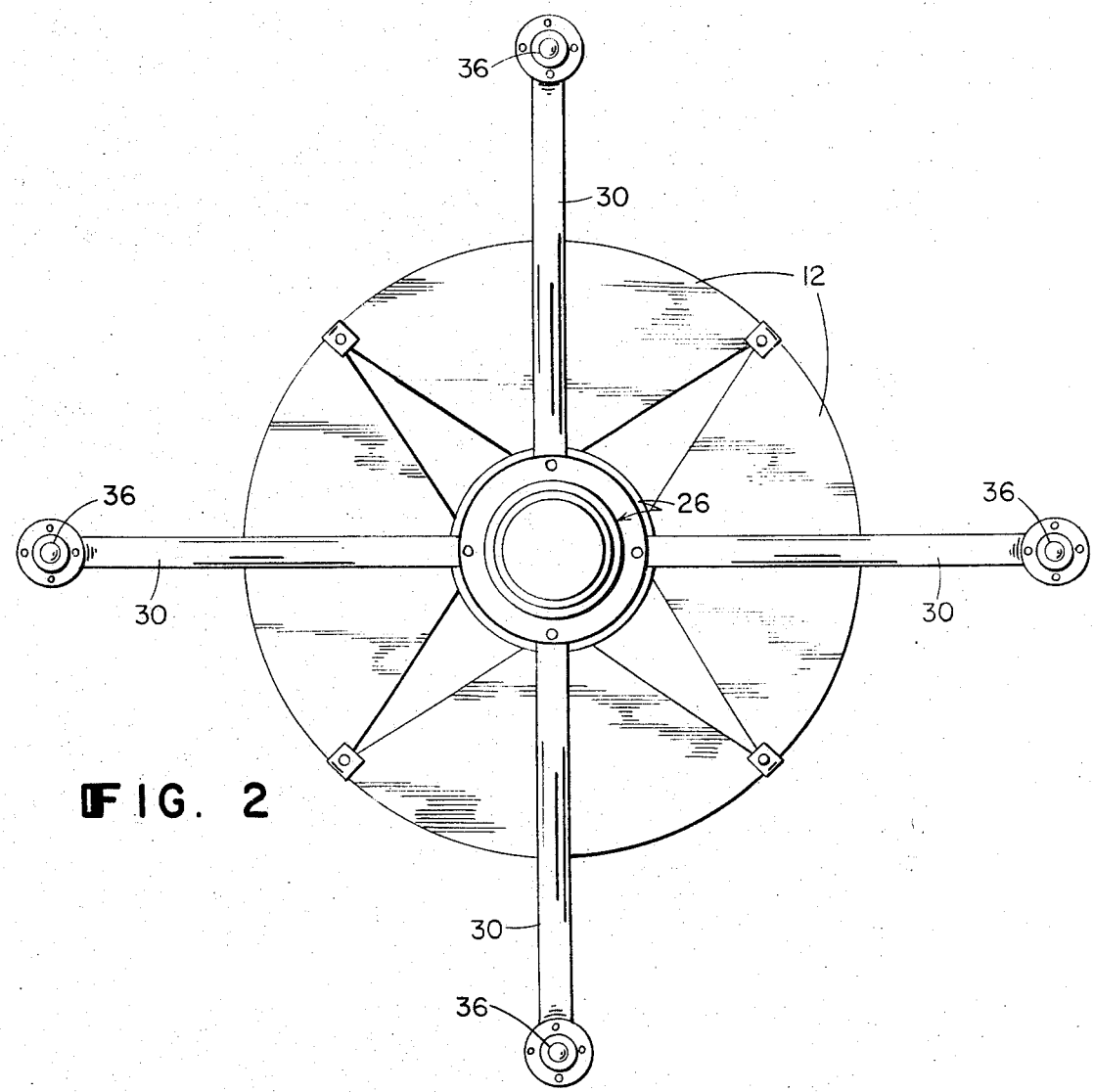
FIG. 2 is a plan view of the water cooler of FIG. 1.
Figure 3:
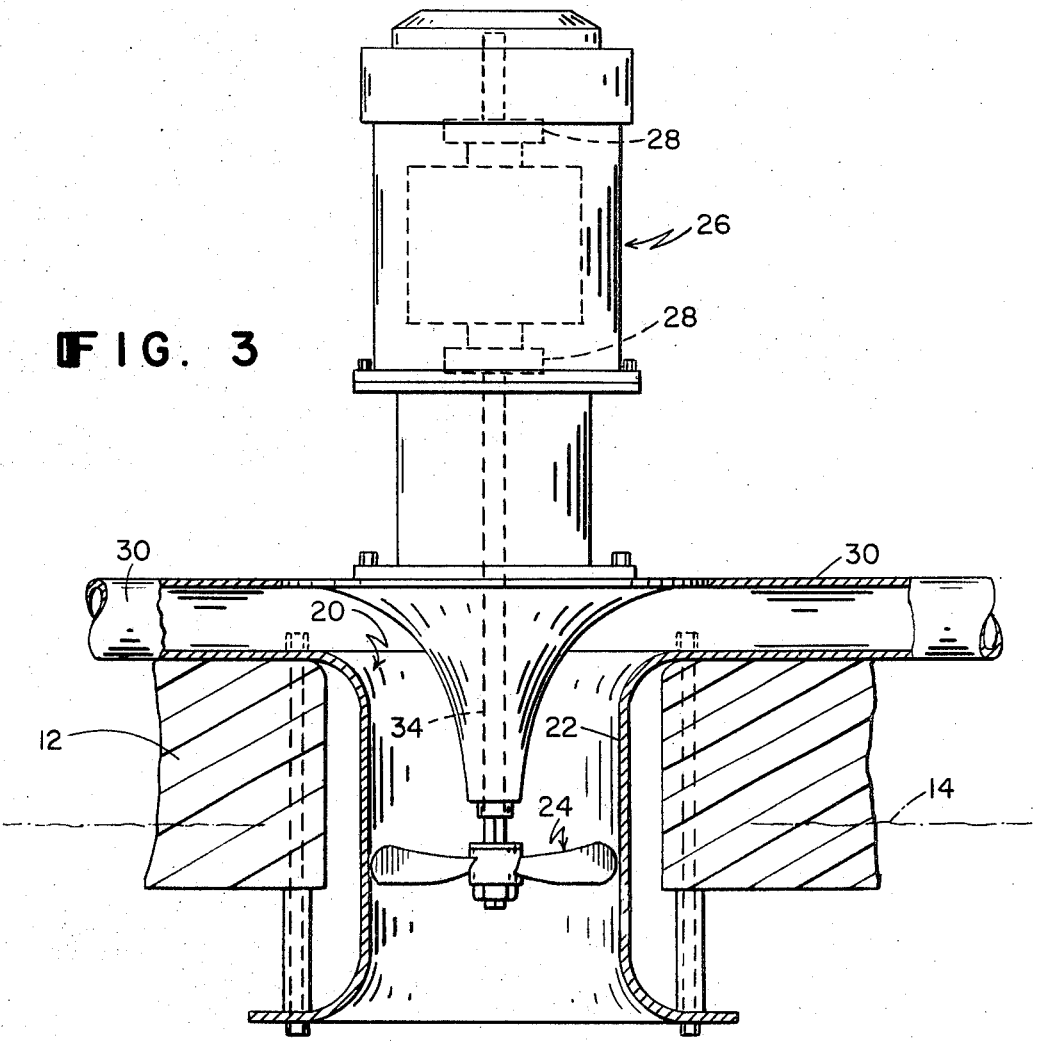
FIG. 3 is a vertical section of a portion of the water cooler of FIG. 1.

In FIGS. 1 through 3 is shown a first embodiment of floating water cooler apparatus according to the invention, for cooling a body of water by propelling a plurality of sprays of water above its surface.

In general, such apparatus comprises a single floating support structure 12, which may in practice consist of a number of float segments assembled into a single float, with a load waterline 14 and generally circular in shape, having a central opening within which is mounted the duct assembly. Such assembly includes a central cylindrical duct 20 having a vertical axis and an interior peripheral surface 22 providing a vertical flow passage.

According to the present invention, in order to provide a novel single float water cooler having a plurality of sprays on a single float, central cylindrical duct 20 has connected to its upper end a plurality, herein shown as four but which may be even greater in number, of generally horizontal water conduits 30, said conduits extending radially outwardly above support structure 12 and its load waterline 14 preferably somewhat beyond said support structure. At their outer ends, conduits 30 are provided with upwardly directed spray nozzles 36.

A non-sealing impeller 24 is mounted in duct 20 below load waterline 14 with its axis coincident with the axis of said duct and an impeller driving motor 26 is mounted on floating support structure 12 thereabove. Motor 26 has motor bearings 28 supporting a drive shaft 34 extending downwardly therefrom with its axis coincident with that of said impeller and said duct.

In operation, the single float water cooler of FIGS. 1 through 3, with impeller 24 driven by motor 26, impells water upwardly, into conduits 30 and thence upwardly from nozzles 36 to provide a plurality, herein four, of sprays, well spaced from one another, to provide highly efficient cooling with but a single motor and float.

Figure 4:
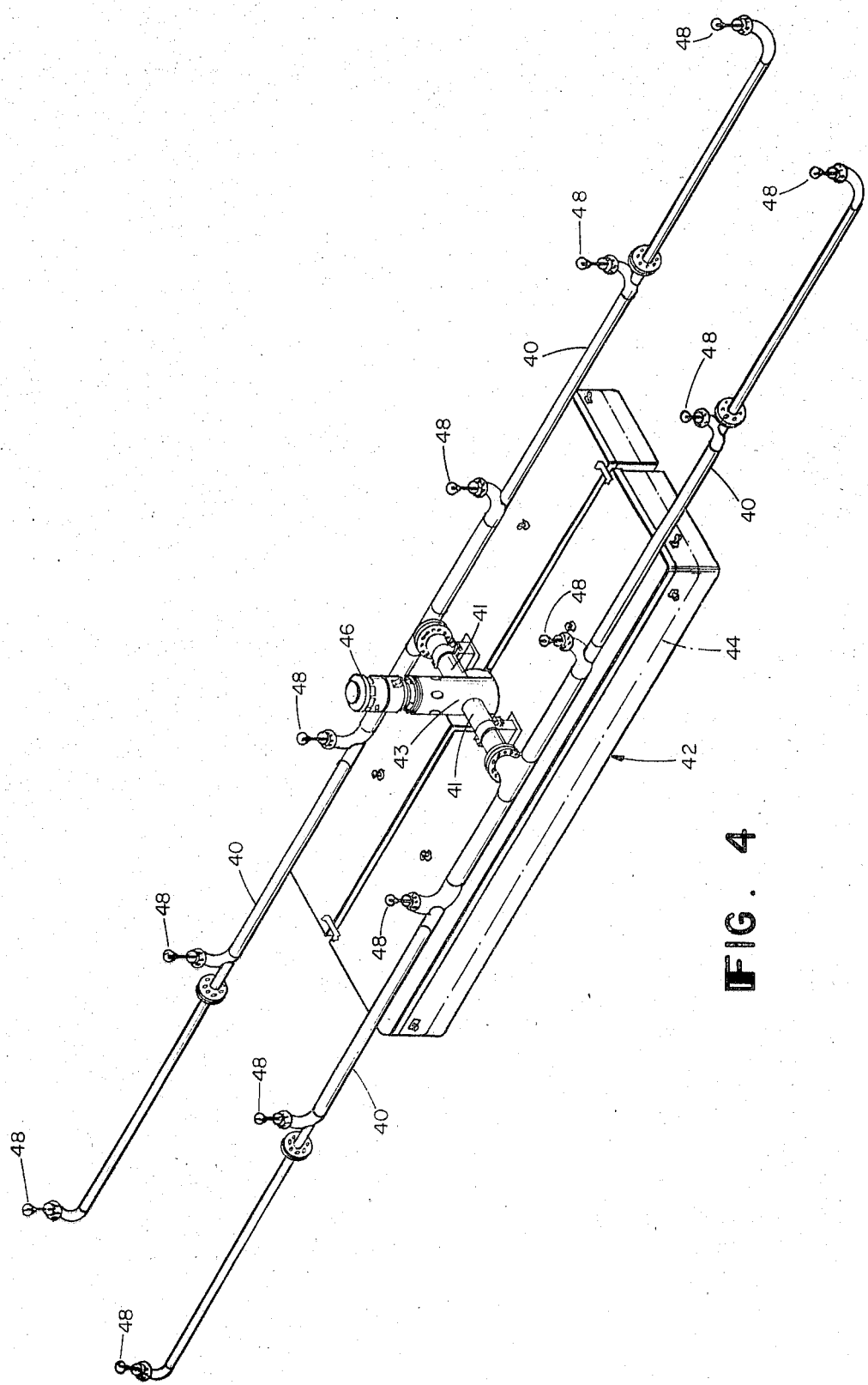
FIG. 4 is an isometric view of a second embodiment of the water cooler of the invention.

In FIG. 4 is shown a second, larger capacity embodiment of floating water cooler apparatus according to the invention, again comprising a single floating support structure 42, rectangular in shape which consists of a number of float segments assembled into a single float, with a load waterline 44 and having a central opening within which is mounted a duct cooler assembly as described in connection with FIGS. 1 through 3, including a non-sealing impeller (not shown) and a driving motor 46.

In the embodiment of FIG. 4, central cylindrical duct 43 has connected to its upper end by means of opposed pipes 41 a plurality, herein shown as four arranged as an "H", but which may be even greater in number, of generally horizontal water conduits 40, said conduits extending outwardly above support structure 42 and its load waterline 44 well beyond said support structure. Therealong and at their outer ends, conduits 40 are provided with a plurality of upwardly directed spray nozzles 48, herein shown as three in number for each conduit 40, that is, a total of twelve.

As before, in operation, the single float water cooler of FIG. 4, with its impeller driven by motor 46, impells water upwardly, into conduits 40 and thence upwardly from nozzles 48 to provide a plurality, herein twelve, of sprays, well spaced from one another, to provide highly efficient cooling with but a single motor and float.

With either of the embodiments of FIGS. 1 through 3 or of FIG. 4, when it is desired to stop operation, the location of the conduits above the load waterline of the floating support with their outer ends at least at a vertical height above said load waterline as great as their inner ends, together with the non-sealing nature of the impeller, permits water in all of the conduits to drain back through said conduits and the central duct for complete drainage of said conduits. This has substantial advantages, not only in preventing formation of ice in the conduits, but also in reducing the weight of the floating assembly when it must be removed for cleaning, repair or the like. Furthermore, due to to the unique positioning of the conduits above the water, they are not subject to fouling by marine growth.

What is claimed is:

1. Floating water cooler apparatus for cooling a body of water by propelling a plurality of sprays of water above the surface of said body comprising a single floating support having a load waterline and a central cylindrical duct with a vertical axis, said duct providing a vertical flow passage an axial flow non-sealing impeller mounted in said duct below said load waterline with its axis coincident with the axis of said duct impeller driving means including a motor mounted above said floating support and having a downwardly extending driving shaft coincident with the axis of said impeller for driving said impeller a plurality of water conduits mounted on said floating support and connected at their inner ends to said duct above said impeller said conduits extending outwardly above the load waterline of said support with their outer ends above said load waterline upwardly directed spray nozzle means mounted on said conduits for spraying water from said impeller said water being free to drain from said conduits and said duct upon stopping of said impeller from complete drainage of said conduits.

2. Floating water cooler apparatus as claimed in claim 1 wherein said conduits extend radially outwardly from said duct.

3. Floating water cooler apparatus as claimed in claim 2 including at least four said conduits.

4. Floating water cooler apparatus for cooling a body of water by propelling a plurality of sprays of water above the surface of said body comprising a single floating support having a load waterline and a central cylindrical duct with a vertical axis, said duct providing a vertical flow passage an axial flow non-sealing impeller mounted in said duct below said load waterline with its axis coincident with the axis of said duct impeller driving means including a motor mounted above said floating support and having a downwardly extending driving shaft coincident with the axis of said impeller for driving said impeller a plurality of water conduits mounted on said floating support and connected at their inner ends to said duct above said impeller said conduits extending outwardly above the load waterline of said support with their outer ends at least at a vertical height above said load waterline as great as their said inner ends upwardly directed spray nozzle means mounted on the outer ends of said conduits for spraying water from said impeller said water being free to drain back through said conduits and said duct upon stopping of said impeller for complete drainage of said conduits.

5. Floating water cooler apparatus as claimed in claim 4 wherein said conduits are arranged in the form of an H connected centrally to said duct and a plurality of spray nozzle means are mounted on each of said conduits.

* * * * *

UNITED STATES PATENT OFFICE
CERTIFICATE OF CORRECTION

Patent No. 3,785,558  Dated January 15, 1974

Inventor(s) George W. Albritton, Ronald C. Wendt, Michael A. Morava

It is certified that error appears in the above-identified patent and that said Letters Patent are hereby corrected as shown below:

The name Michael A. Morava should be added to the list of inventors.

Signed and sealed this 10th day of September 1974.

(SEAL)
Attest:

McCOY M. GIBSON, JR.  C. MARSHALL DANN
Attesting Officer  Commissioner of Patents

FORM PO-1050 (10-69)

USCOMM-DC 60376-P69